UNITED STATES PATENT OFFICE.

GADIENT ENGI, OF BASEL, SWITZERLAND, ASSIGNOR TO THE FIRM OF SOCIETY OF CHEMICAL INDUSTRY IN BASLE, OF BASEL, SWITZERLAND.

RED VIOLET TO VIOLET-BLUE DYE AND PROCESS OF MAKING SAME.

No. 836,309.        Specification of Letters Patent.        Patented Nov. 20, 1906.

Application filed May 26, 1906. Serial No. 318,833.

*To all whom it may concern:*

Be it known that I, GADIENT ENGI, chemist and doctor of philosophy, a citizen of the Swiss Republic, and a resident of Basel, Switzerland, have invented new and useful Red Violet to Violet-Blue Vat-Dyeing Dyestuffs and Processes for the Manufacture of the Same, of which the following is a full, clear, and exact description.

The present invention relates to the manufacture of red violet to violet-blue vat-dyeing dyestuffs by condensing thioindoxyl with the alpha-isatinarylides of the general formula:

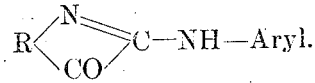

The invention is illustrated by the following examples:

Example I: Three parts of salicylthioacetic acid, 2.5 parts of alpha-isatinanilid, and twenty-five to thirty parts of acetic anhydrid are heated to boiling for three hours in a reflux apparatus. After a short time the solution becomes of a beautiful blue-violet color and the condensation product separates. Its formation results from the condensation of alpha-isatinanilid with thioindoxyl into which the salicylthioacetic acid is intermediary transformed during the reaction. When the reaction is over, the whole is allowed to cool and filtered. The product on the filter is washed with alcohol and dried. The dyestuff is thus obtained directly in a pure form as lustrous blue-violet felted needles. In concentrated sulfuric acid it dissolves to a blue solution having a green tinge. By diluting the sulfuric-acid solution with water the dyestuff is precipitated again unchanged as dark violet-blue flocks. In warm benzene it is easily soluble to a red-violet solution having a brown-red fluorescence. When made into a vat with caustic-soda lye and sodium hydrosulfite, the dyestuff yields a bright-yellow vat, from which cotton without a mordant is dyed violet-blue tints. For facilitating making it up into a vat the dyestuff is used in as finely divided a form as possible—for instance, as a paste. To obtain it in such a condition, the crystallized dyestuff may be dissolved in concentrated sulfuric acid and reprecipitated with water, or it may be made up into an alkaline vat and precipitated by introducing air, whereupon the flocculent precipitated product may be filtered.

Example II: Two parts of thioindoxyl, three parts of alpha-isatinanilid, and thirty parts of acetic anhydrid are heated to boiling for two to three hours in a reflux apparatus in an oil-bath. After cooling, the dyestuff, which has crystallized, is filtered, washed with alcohol, and dried. It forms violet-red crystals, which dissolve in concentrated sulfuric acid to a blue-green solution. The solution in benzene is violet-red and has a fairly intense yellow-red fluorescence. In an alkaline hydrosulfite vat the dyestuff dyes cotton without a mordant red-violet tints of remarkable fastness.

Example III: Two parts of thioindoxyl, 1.5 parts of alpha-isatinanilid, and twenty parts of nitrobenzene are heated for one and one-half hours in a reflux apparatus in an oil-bath the temperature of which is 225° to 228° centigrade. After the mass has cooled the dyestuff, which has crystallized, is filtered, washed with alcohol, and dried. When made up into an alkaline vat, it dyes cotton without a mordant blue-violet tints.

Example IV: To two parts of thioindoxyl dissolved in alcohol is added an alcoholic solution of three parts of isatinanilid. After this mixture has been boiled for a short time 0.3 to 0.5 parts of sodium carbonate are added and the mass is boiled during some minutes, whereby the reaction product separates in form of bluish-violet crystals, which are isolated by filtration, washed with alcohol to eliminate the adherent sodium carbonate, and dried. The dyestuff constitutes a bluish-violet crystalline powder, dyeing unmordanted cotton in an alkaline hydrosulfite vat violet-blue tints. In analogous manner dyestuffs may be manufactured from other alpha-isatinarylids, such as alpha-isatin-orthotoluidid or alpha or beta naphthyl isatinarylids.

What I claim is—

1. The herein-described process for the manufacture of red violet to violet-blue vat-dyeing dyestuffs, by condensing thioindoxyl with alpha-isatinarylids of the general formula:

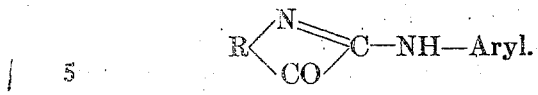

2. As new products, the red violet to violet-blue vat-dyeing dyestuffs resulting from the condensation of thioindoxyl with alpha-isatinarylids, the said dyestuffs giving with concentrated sulfuric acid blue solutions from which the dyestuffs are precipitated unchanged by addition of water, and dissolving in hot benzene with violet red to red-violet coloration.

In witness whereof I have hereunto signed my name, this 14th day of May, 1906, in the presence of two subscribing witnesses.

GADIENT ENGI.

Witnesses:
GEO. GIFFORD,
AMAND RITTER.